United States Patent [19]

Bening

[11] Patent Number: 5,478,899
[45] Date of Patent: Dec. 26, 1995

[54] ALKOXY SILYL CAPPING AGENTS FOR MAKING TERMINALLY FUNCTIONALIZED POLYMERS

[75] Inventor: Robert C. Bening, Katy, Tex.

[73] Assignee: Shell Oil Company, Houston, Tex.

[21] Appl. No.: 330,054

[22] Filed: Oct. 27, 1994

[51] Int. Cl.$^6$ ....................................................... C08F 8/00
[52] U.S. Cl. ............................... 526/84; 525/102; 525/105; 526/335; 526/338; 526/340
[58] Field of Search ............................... 526/84; 525/102, 525/105

[56] References Cited

U.S. PATENT DOCUMENTS 5,331,058  7/1994  Shepherd et al. .
5,432,242  7/1995  Baron ........................................ 526/84

OTHER PUBLICATIONS

M. A. Peters & J. M. DeSimone "A General Method for the Synthesis of Telechelic Materials", 1994, Polym. Prepr. (Am. Chem. Soc. Div. Polym. Chem), vol. 35(2), pp. 484–485.

*Primary Examiner*—Bernard Lipman
*Attorney, Agent, or Firm*—Keith M. Tackett

[57] ABSTRACT

The capping of anionic polymers to make functionalized polymers is improved by using alkoxy silyl compounds having protected functional groups, such as acetal groups, as the capping agent. The protected functional groups are stable under a variety of conditions and then readily convert to more reactive terminal functional groups useful for making adhesives, sealants and coatings.

9 Claims, No Drawings

ALKOXY SILYL CAPPING AGENTS FOR MAKING TERMINALLY FUNCTIONALIZED POLYMERS

FIELD OF THE INVENTION

This invention relates to preparation of functionalized polymers used as components in adhesives, sealants and coatings. More specifically, this invention relates to capping of living anionic polymers to add terminal functional groups.

BACKGROUND OF THE INVENTION

Anionic polymerization of conjugated dienes with lithium initiators, such as sec-butyllithium, and hydrogenation of residual unsaturation has been described in many references. The capping of mono-initiated and di-initiated living anionic polymers to form functional end groups is described in U.S. patent application Ser. No. 938,917 filed Aug. 31, 1992 (T3229).

Anionic polymerization using protected functional initiators having the structure $R^1R^2R^3Si\text{-}O\text{-}A'\text{-}Li$ is described in U.S. No. 5,331,058 wherein $R^1$, $R^2$, and $R^3$ are preferably alkyl, alkoxy, aryl, or alkaryl groups having from 1 to 10 carbon atoms, and A' is preferably a branched or straight chain bridging group having at least 2 carbon atoms. Polymerization with such a protected functional initiator, followed by capping to produce a second terminal functional group, produces telechelic polymers which otherwise can be prepared by capping polymers prepared with difunctional initiators such as 1,4 dilithiobutane and lithium naphthalide. The use of a protected functional group avoids the formation of ionic gels which occur when diinitiated polymers are capped with reagents such as ethylene oxide. These gels form even in relatively polar solvent mixtures and hinder subsequent processing steps.

One way to prepare difunctional telechelic polymers without forming a gel is to use a protected functional initiator such as the structure:

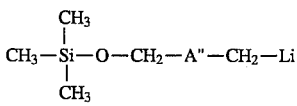

wherein A" is cyclohexyl or -CR'R"-, wherein R' is a linear alkyl having from 1 to 10 carbon atoms and R" is hydrogen or a linear alkyl having from 1 to 10 carbon atoms. The compounds of structure (A) initiate polymerization of anionic polymers at high polymerization temperatures. The protected functional group survives hydrogenation of conjugated diene polymers and is readily removed by hydrolysis in the presence of methanesulfonic acid. The initiators of structure (A) can be used to make telechelic polymers by capping with ethylene oxide or oxetane. However, oxetane is not readily available on a commercial scale and ethylene oxide can be hazardous due to its reactivity and toxicity.

A recent publication by M. A. Peters and J. M. DeSimone (Polym. Prepr. (*Am. Chem. Soc. Div. Polym. Chem.*), 1994, 35(2), 484) describes the preparation of mono- and di-functional polymers by capping mono-initiated and di-initiated living anionic polymers with a chlorosilane of the following structure:

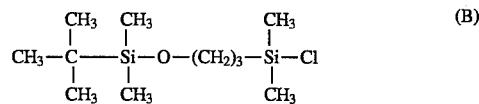

instead of ethylene oxide or oxetane. In this process, LiCl is eliminated and the protected alcohol group is added to the polymer chain end, avoiding gel formation.

SUMMARY OF THE INVENTION

The present invention is the discovery that mono-initiated or di-initiated anionic polymers are efficiently capped with silyl alkoxy compounds possessing acidic alkoxy radicals as leaving groups and a variety of protected functional groups, resulting in terminal protected functional groups that are stable under a variety of conditions. The protected functional group is preferably an acetal group, but can be any group that readily converts to more reactive terminal functional groups useful for making adhesives, sealants and coatings.

DETAILED DESCRIPTION OF THE INVENTION

The anionic polymerization of unsaturated monomers with mono-lithium initiators such as s-butyllithium or di-lithium initiators such as the diadduct of s-butyllithium and m-diisopropenylbenzene is described in U.S. patent application Ser. No. 938,917 filed Aug. 31, 1992 (T3229) which description is incorporated by reference herein. Polymerization results in one or more terminal lithium atoms which readily react with ethylene oxide or oxetane to cap the polymers with one or more terminal hydroxyl groups per molecule. The terminal hydroxyl groups tend to form weak associations between molecules, which has no adverse effects if these chains are mono-initiated. However, the di-alkoxide polymer anions formed by capping di-initiated polymers associate to form an ionic gel which is very difficult to process.

The use of the protected-functional capping agent of structure (B) avoids gel formation and avoids the problems presented by capping with cyclic ethers. However, the use of this reagent to cap low molecular weight polymer anions results in the generation of large amounts of lithium chloride, which introduces new difficulties. For example, the preferred method for converting the silyl ether to the alcohol involves contact with aqueous methanesulfonic acid. The presence of high levels of halide in such a mixture presents severe corrosion problems. Also, the polymers are preferably hydrogenated with a Ni/Al catalyst (to be described in detail below) that is poisoned by high levels of halide. In order to hydrogenate polymers capped with structure (B), an aqueous acid wash would likely be required to remove the LiCl. A drying step would probably also be required, since the catalyst is also deactivated by water.

The advantages gained by using a protected-functional capping agent are realized without introducing halide ions by capping mono-initiated or di-initiated polymers with silyl alkoxides having acidic alkoxy leaving groups and stable protecting groups as shown by the following structure:

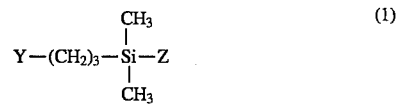

wherein Y is a protected functional group, preferably an acetal group, which is stable during the polymerization step and converts to more reactive terminal functionality as described below, and Z is an acidic alkoxy group, preferably phenoxy radicals or trifluoroethoxy radicals. The acetal group is preferred as the protecting group since it is easily introduced and cleaved, and has more favorable raw material costs than the t-butyl dimethylsilyl ether group of structure (B) or the trimethylsilyl ether group of structure (A).

The alkoxy silyl capping agents of equation (1) are prepared by hydrosilation of the appropriate dimethylsilane $(Z-Si(CH_3)_2H)$ with an allyl species containing the protected functional group $(CH_2=CH-CH_2-y)$. Hydrosilation was accomplished using a Pt catalyst, as is generally described by M. A. Peters and J. M. DeSimone (Polym. Prepr. (*Am. Chem. Soc. Div. Polym. Chem.*), 1994,35(2), 484). After capping of the polymer, the protecting group is removed by reaction with methanesulfonic acid, as described in U.S. patent application No. 155,665 filed Nov. 22, 1993 (TH0010) which disclosure is incorporated by reference herein.

A variety of processes for removal of the protecting groups are known; for a review, see T. W. Greene, "Protective Groups in Organic Synthesis", J. Wiley and Sons, New York, 1981, incorporated herein by reference. A preferable process would involve easily handled, relatively low toxicity, and inexpensive reagents. In a preferred process, the acetal group is removed by reaction of the polymer solution with 1–10 equivalents (basis acetal end groups) of a strong organic acid, preferably methanesulfonic acid (MSA), in the presence of 0.1% –2% by weight of water and 5% –50% by volume of isopropanol (IPA) at about 50° C.

Mono-initiation is preferentially performed using s-butyllithium. Di-initiation is preferentially performed using the diadduct of s-butyllithium and m-diisopropenylbenzene, as described in U.S. patent application Ser. No. 938,917 filed Aug. 31, 1992 (T3229) which is incorporated by reference herein. Polymerization is preferably initiated at a temperature from 20° C. to 60° C., most preferably from 30° C. to 40° C. It is generally advisable to keep the polymerization temperature below about 100° C.; above this temperature, side reactions that change microstructure and limit capping efficiency may become important. Polymerizations can be carried out over a range of solids, preferably from about 5% to about 80%, most preferably from about 10% to about 40%. For high solids polymerizations, it is preferable to add the monomer in increments to avoid exceeding the desired polymerization temperature. If the initiator is to be added to the full monomer charge, it is preferable to run the polymerization between 10% and 20% solids.

The protected group is introduced by reacting 1.05–2 equivalents of the capping agent of structure (1) per lithium site (2 per chain in the case of di-initiated polymers) at a temperature of 40°–80° C. for at least 30 minutes. If no polar microstructure modifier was present during the polymerization, it may be desirable to add a non-reactive coordinating agent, such as diethyl ether or glyme, during this step.

The polymers of the present invention preferably comprise a polymerized unsaturated monomer selected from the groups consisting of styrene, 1,3-butadiene, and isoprene. When the anionic polymer comprises polymerized 1,3-butadiene which contains residual monomer unsaturation which is to be saturated by hydrogenation, the anionic polymerization of the conjugated diene hydrocarbons is typically controlled with structure modifiers such as diethyl ether or glyme (1,2-diethoxyethane) to obtain the desired amount of 1,4-addition. As described in Re 27,145 which is incorporated by reference herein, the level of 1,2-addition of a butadiene polymer or copolymer can greatly affect elastomeric properties after hydrogenation. The hydrogenated polymers exhibit improved heat stability and weatherability in the final, adhesive, sealant or coating.

The 1,2-addition of 1,3-butadiene polymers having terminal functional groups influences the viscosity of the polymers as described in more detail below. A 1,2-addition of about 40% is achieved during polymerization at 50° C. with about 6% by volume of diethyl ether or about 1000 ppm of glyme. Generally, vinyl contents in this range are desirable if the product is to be hydrogenated, while low vinyl contents are preferred if the polymer is to be used in its unsaturated form.

Hydrogenation of at least 90%, preferably at least 95%, of the unsaturation in low molecular weight butadiene polymers is achieved with nickel catalysts as described in U.S. Patents Re. 27,145 and 4,970,254 and U.S. patent application Ser. No. 07/785715 which are incorporated by reference herein. The preferred nickel catalyst is a mixture of nickel 2-ethylhexanoate and triethylaluminum described in more detail in the examples. It is preferable to extract the nickel catalyst after hydrogenation by stirring the polymer solution with aqueous phosphoric acid (20–30 percent by weight), at a volume ratio of about 0.5 parts aqueous acid to 1 part polymer solution, at about 50° C. for 30–60 minutes while sparging with a mixture of oxygen in nitrogen. This step is also described in more detail in the examples.

Sufficient IPA must be present during deprotection to prevent the formation of a discrete aqueous phase. Excess acid is then removed by washing with dilute aqueous base, preferably 0.1N –0.5N sodium hydroxide, followed by water. For some applications, such as coatings prepared by baked cures of the polymer with amino resins in the presence of a strong organic acid catalyst, it may be preferable to use the polymer in its "protected" form. The viscosity of the protected polymer is lower and conditions such as those described above should accomplish the deprotection (generate the alcohol) during the cure.

The conjugated diene polymers produced as described above have the conventional utilities for terminally functionalized polymers of such as forming adhesives, coatings, and sealants. Additionally, the polymers may be used to modify polyurethanes, polyesters, polyamides, polycarbonates, and epoxy resins.

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. Tufflo® 6056 and 6204 oil made by Arco and process oils, e.g. Shellflex® 371 oil made by Shell. The amounts of rubber compounding oil employed in the invention composition can vary from 0 to about 500 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Various types of fillers and pigments can be included in the coating or sealant formulation. This is especially true for exterior coatings or sealants in which fillers are added not only to create the desired appeal but also to improve the performance of the coatings or sealant such as its weatherability. A wide variety of fillers can be used. Suitable fillers include calcium carbonate, clays, talcs, silica, zinc oxide, titanium dioxide and the like. The amount of filler usually is in the range of 0 to about 65% w based on the solvent free portion of the formulation depending on the type of filler used and the application for which the coating or sealant is intended. An especially preferred filler is titanium dioxide.

The dihydroxylated conjugated diene polymers of the present invention may also be blended with other polymers to improve their impact strength and/or flexibility. Such polymers are generally condensation polymers including polyamides, polyurethanes, vinyl alcohol polymers, vinyl ester polymers, polysulfones, polycarbonates and polyesters, including those, like polyacetones, which have a recurring ester linkage in the molecule, and those, like polyalkylene arylates, including polyalkylene terephthalates, having a structure formed by polycondensation of a dicarboxylic acid with a glycol. The blends may be made in the reactor or in a post compounding step.

DETAILED DESCRIPTION OF PREFERRED EMBODIMENTS

The preferred process of the present invention caps di-initiated 1,3-butadiene polymers with alkoxy silyl capping agents having acetal protecting groups represented by the structure:

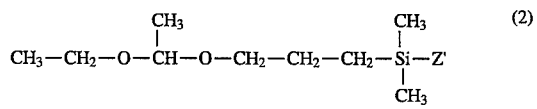

$$CH_3-CH_2-O-\underset{\underset{CH_3}{|}}{CH}-O-CH_2-CH_2-CH_2-\underset{\underset{CH_3}{|}}{\overset{\overset{CH_3}{|}}{Si}}-Z' \quad (2)$$

wherein Z' is a phenoxy group or a trifluoroethoxy group. The alkoxy silyl capping agents of equation (2) are prepared by hydrosilation of the appropriate dimethylsilane ($Z-Si(CH_3)_2H$) with the vinyl acetal resulting from the reaction of ethyl vinyl ether and allyl alcohol in the presence of an acid catalyst. Hydrosilation was accomplished using a Pt catalyst, as is generally described by M. A. Peters and J. M. DeSimone (*Polym. Prepr.* (*Am. Chem. Soc. Div. Polym. Chem.*), 1994,35(2), 484). After capping of the polymer, the protecting group is removed by reaction with methanesulfonic acid, as described in U.S. patent application No. 155,665 filed Nov. 22, 1993 (TH0010) which disclosure is incorporated by reference herein.

The preferred process ultimately produces dihydroxylated, saturated 1,3-butadiene polymers having a peak molecular weight from 500 to 200,000, most preferably from 500 to 20,000. The dihydroxylated polymers can be unsaturated with 1,2-addition from 5% to 95% or hydrogenated with 1,2-addition from 30% to 70%. The polymers preferably have from 1.75 to 2.0, most preferably from 1.95 to 2.0, terminal hydroxyl groups per molecule.

The preferred process initially makes a novel intermediate polymer which has a protected acetal functional group on each end of a linear 1,3-butadiene polymer. The intermediate polymer can be sold in a saturated or unsaturated version for making adhesives, sealants, and coatings wherein either the supplier or the customer deprotects the functional groups by a reaction that converts the protected functional groups to hydroxyl groups.

The preferred process comprises di-initiation with the diadduct of s-butyllithium and m-diisopropenylbenzene, polymerization of 1,3-butadiene, and capping with an acidic alkoxy silyl acetal having structure (2). The reaction results in exclusion of lithium alkoxide and the silyl acetal protecting group replaces the lithium at both ends of the living anionic polymer molecule.

The intermediate polymers of the present invention are useful for making adhesives (including pressure sensitive adhesives, contact adhesives, laminating adhesives and assembly adhesives), sealants (such as urethane architectural sealants, etc.), coatings (such as topcoats for automotive, epoxy primers for metal, polyester coil coatings, alkyd maintenance coatings, etc.), films (such as those requiring heat and solvent resistance), molded and extruded thermoplastic and thermoset parts (for example thermoplastic injection molded polyurethane rollers or reaction injection molded thermoset auto bumper, facie, etc.).

The present invention is further described by the following examples which include the best mode known to Applicant for making a saturated, linear polybutadiene polymer having one or two terminal silyl acetal groups. The examples are not intended to limit the present invention to specific embodiments although each example may support a separate claim which Applicant asserts to be a patentable invention.

EXAMPLES

The peak molecular weights were measured using gel permeation chromatography (GPC) calibrated with polybutadiene standards having known peak molecular weights. The solvent for the GPC analyses was tetrahydrofuran.

The 1,2-additions of polybutadiene were measured by $^{13}C$ NMR in chloroform solution.

Three protected-functional capping agents, ethyl(dimethylethoxysilylpropyl) formaldehyde acetal (CA1), ethyl(dimethylphenoxysilylpropyl) formaldehyde acetal (CA2), and ethyl(dimethyl-3,3,3-trifluoroethoxysilylpropyl) formaldehyde acetal (CA3), were prepared by hydrosilation of the appropriate dimethylsilane (dimethylethoxysilane, dimethylphenoxysilane, and dimethyl-3,3,3-trifluoroethoxysilane, respectively) as described previously. Reaction conditions are summarized in Table 1 for these agents.

Example 1

Poly(butadiene) "mono-ols" were prepared by initiation with s-butyllithium while poly(butadiene) "diols" were prepared by initiation with the product of diisopropenyl benzene and 2 equivalents of s-butyllithium. Unless otherwise specified, polymer examples 1-1 through 3-2 were prepared in cyclohexane/diethyl ether(10%) and methanol was added to terminate any uncapped chains. For the alkoxy silyl acetal capping agents of structure (2) (i.e. CA1, CA2, and CA3), the characteristic yellow color of the polymer anion faded considerably after adding the capping agent. Samples were deprotected using methanesulfonic acid, dried (rotary evaporator), and analyzed by GPC, $^{13}C$ NMR, and HPLC. Samples taken prior to deprotection were contacted with concentrated phosphoric acid to remove or neutralize lithium salts prior to drying; except in one case, described below, this did not result in significant hydrolysis of the acetal groups.

To simplify the analysis, screening studies were carried out using "mono-initiated" polymers although diinitiated polymers are preferred. The results are summarized in Table 2. HPLC could not unambiguously resolve acetal-capped polymer from proton-terminated polymer, so only NMR data was used to assess the capping efficiency prior to deprotection. The results of the analysis of the deprotected products are also summarized in Table 2; $^{13}C$ NMR results are consistent with quantitative hydrolysis of the acetal group. The more acidic alkoxy capping agents were much more reactive than the ethoxy analog, yielding capping efficiencies on the order of 90% without adding THF or any other reaction promoter.

GPC analysis indicated that a small fraction of the polymer anions were coupled (twice original MW). This may be due to oxygen coupling or the presence of a small amount of silane impurity with two "active" ligands; the capping agents were added without further purification. These experiments also suggest that both capping agents react readily at moderate temperatures. Analysis by NMR could detect no significant improvement in capping efficiency between samples capped for 30 minutes at 40° C. and samples taken after heating to 80° C. and holding at 80° C. for an hour.

EXAMPLE 2

In order to assess the utility of this approach for preparing diols, a diinitiated butadiene polymer (Example 2-1) was capped with the phenoxy silyl acetal compound (CA2) at 40° C., and an aliquot of the same cement was reacted with excess ethylene oxide (Example 2-2). The analytical results are summarized in Table 3. The silyl acetal capped product remained a viscous liquid while the ethylene oxide capped product formed a gel. After deprotection, the silyl acetal capped product was analyzed by HPLC as well as $^{13}$C NMR. The NMR results indicate slightly higher capping efficiency with the phenoxy silyl acetal than with ethylene oxide. The HPLC chromatograms are consistent with this conclusion. The ethylene oxide capped product contains substantially more unfunctionalized and mono-functionalized material and less diol. A substantial amount of material, tentatively identified as tri-ol (resulting form initiation by trifunctional lithium species), was also observed. The relatively high levels of both mono-ol and tri-ol in this polymerization suggest that the optimum yield of diinitiator may not have been achieved, but it is clear that products comparable to those obtained by EO capping were produced without the complications of the gel using the alkoxy silyl approach.

EXAMPLE 3

A sample (3-1) prepared by capping a monoinitiated polymer with the phenoxy silyl acetal compound (CA2), followed by methanol termination was hydrogenated using 300 ppm of a 2.5:1 Al:Ni catalyst, added in three 100 ppm aliquots over 3 hours. About 95.6% of the polymer double bonds were hydrogenated. A sample of this cement was isolated without methanol addition (3-2). Surprisingly, the acetal seems to have been hydrolyzed by the phosphoric acid neutralization; an unusually high level of suspended salts was also noted in the dry sample. On standing, a significant amount of precipitate, presumably lithium phenoxide, settled out of the solution. After decanting from the precipitate, the sample was hydrogenated as described above; the extent of hydrogenation achieved was quite low, only about 56%. The reason for the decreased yield is unclear, but it seems safe to conclude that it is preferable to terminate with methanol prior to hydrogenation.

TABLE 1

Summary of Alkoxy Silyl Capping Reaction Conditions.

| Sample | Initiator | CA # | CA:Li | Rxn Time | Rxn Temp |
|---|---|---|---|---|---|
| 1-1 | s-BuLi | CA1 | 1.5:1 | 60 min.[1] | 80° C.[1] |
| 1-2 | s-BuLi | CA1[2] | 1.5:1 | 60 min.[1] | 80° C.[1] |
| 1-3 | s-BuLi | CA1[3] | 1.5:1 | 60 min.[1] | 80° C.[1] |
| 1-4 | s-BuLi | CA2 | 1.5:1 | 30 min. | 40° C. |
| 1-5 | s-BuLi | CA2 | 1.5:1 | 60 min.[4] | 80° C. |
| 1-6 | s-BuLi | CA3 | 1.5:1 | 30 min. | 40° C. |
| 1-7 | s-BuLi | CA3 | 1.5:1 | 60 min.[4] | 80° C. |
| 2-1 | DiLi[5] | CA2 | 1.05:1 | 80 min. | 40° C. |
| 3-1,3-2[6] | s-BuLi | CA3 | 1:1 | 60 min. | 40° C. |

[1]CA added at 40° C., then heated to 80° C. for 60 min.
[2]100 ppm glyme added with CA1.
[3]Tetrahydrofuran added until 5% by volume, prior to CA1.
[4]Prepared by heating preceding 30 min/40° C. sample to 80° C. and holding for 60 min.
[5]Product of 2 moles s-butyllithium and 1 mole diisopropenyl benzene (DIPB).

[6]Sample 3-2 was not terminated with methanol.

TABLE 2

Summary of Analytical Data for Mono-ols Prepared by Capping with CA1 and CA2.

| Sample | MW (GPC) | Capping Effic'y(NMR) | % hydrocarb[1] (NMR[2]/HPLC) | % mono-ol[1] (NMR[3]/HPLC) |
|---|---|---|---|---|
| 1-1 | 2,000 | 65% | 40/34 | 60/66 |
| 1-2 | 5,000 | 70% | — | — |
| 1-3 | 4,800 | 83% | 28/15 | 72/85 |
| 1-4 | — | 94% | — | — |
| 1-5 | 4,100[4] | 99% | 22/8 | 78/92 |
| 1-6 | 4,160[4] | 89% | — | — |
| 1-7 | 4,160[4] | 90% | 25/15 | 75/85 |
| 3-1 | 4,320[4] | 80% | 20[5]/10[5,6] | 80/90[5,6] |
| 3-2 | 4,320[4] | 79% | 21[5,7]/10[5] | 79[5,7]/90[5] |

[1]Unless otherwise specified, after deprotection.
[2]No acetal resonances detected by $^{13}$C NMR, consistent with quantitative hydrolysis of all capped chains.
[3]Lower value relative to HPLC and theoretical (complete conversion of capped chains) may be due to error in backing out the contribution of interefering resonances.

TABLE 2-continued

Summary of Analytical Data for Mono-ols Prepared by Capping with CA1 and CA2.

| Sample | MW (GPC) | Capping Effic'y(NMR) | % hydrocarb[1] (NMR[2]/HPLC) | % mono-ol[1] (NMR[3]/HPLC) |
|---|---|---|---|---|

[4]2%–3% polymer of twice this MW (coupled product).
[5]Hydrogenated sample.
[6]Sample deprotected during isolation; did not require treatment with MSA/IPA to effect deprotection.
[7]Capping efficiency prior to deprotection; hydrogenation obscures s-bu resonance so that the s-bu:C—OH ratio cannot be determined.

TABLE 3

Analytical Data for Diols Prepared by Capping with Phenoxy Silyl Acetal (CA2) or Ethylene Oxide (EO).

| Sample | Capping Agent | MW (GPC)[1] | NMR C.E. | % HC (HPLC) | % M-ol (HPLC) | % Diol (HPLC) | % Tri-ol (HPLC) |
|---|---|---|---|---|---|---|---|
| 2-1 | CA2 | 4,700 | 96% | 0.5 | 18 | 50 | 31.5 |
| 2-2 | EO | 4,500 | 86% | 5 | 23.5 | 44.5 | 27 |

[1]MW of 4,400 prior to adding capping agent (MEOH termin.).

We claim:

1. A process for making functionalized polymers, comprising the steps of:
   anionically polymerizing an unsaturated monomer with a mono-lithium or di-lithium initiator; and
   terminating the polymerizing step by addition of an alkoxy silyl compound having the structure:

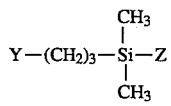

wherein Y is an acetal group, a t-butyl dimethylsilyl group, or a trimethylsilyl ether group, and Z is a phenoxy radical or a trifluoroethoxy radical.

2. The process of claim 1, wherein the polymerizing step is initiated with a di-lithium initiator at a temperature from 20° C. to 60° C.

3. The process of claim 1, wherein the unsaturated monomer is selected from the groups consisting of styrene, 1,3-butadiene, and isoprene.

4. The process of claim 1, wherein Z is a phenoxy radical.

5. The process of claim 4, wherein the unsaturated monomer is 1,3-butadiene.

6. A process for making functionalized polymers, comprising the steps of:
   anionically polymerizing 1,3-butadiene with a mono-lithium or di-lithium initiator; and
   terminating the polymerizing step by addition of an alkoxy silyl acetal compound having the structure:

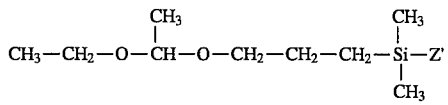

wherein Z' is a phenoxy radical or a trifluorethoxy radical.

7. The process of claim 6, wherein the polymerizing step is initiated with a di-lithium initiator at a temperature from 20° C. to 60° C.

8. The process of claim 7, further comprising the step of hydrogenating residual unsaturation in the functionalized polymer.

9. The process of claim 8, wherein Z' is a phenoxy radical.

* * * * *